United States Patent Office 3,332,916
Patented July 25, 1967

3,332,916
HETEROACETYLENIC COMPOUNDS AND
POLYMERS THEREOF
Allan S. Hay, Schenectady, N.Y., assignor to General
Electric Company, a corporation of New York
No Drawing. Filed Nov. 21, 1962, Ser. No. 239,318
23 Claims. (Cl. 260—80)

This application is a continuation-in-part of my application, Ser. No. 163,910, filed Jan. 2, 1962, now abandoned, and assigned to the same assignee as the present invention.

This invention relates to heteroacetylenic compounds and polymers prepared from such heteroacetylenic compounds, and to the process of their preparation. More particularly, this invention relates to compositions corresponding to the formula

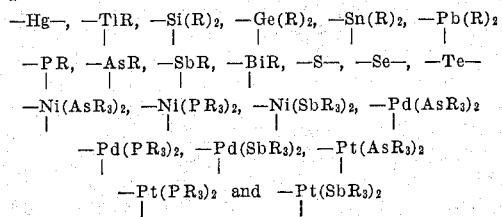

where $n$ is a positive integer, R' is a divalent hydrocarbon radical, the hydrogen atom is on the terminal acetylenic group and M is a divalent radical selected from the group consisting of

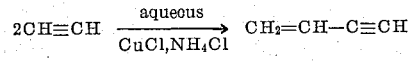

where R is a monovalent hydrocarbons and to the preparation of polymers from such compounds corresponding to the formula

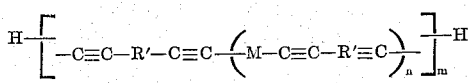

where $m$ is a positive integer and $n$, M and R' are as previously defined, and the hydrogen atoms are on the terminal acetylenic groups of the polymer molecule. These polymers are prepared by a self-condensation reaction of the above-defined heteroacetylenic compounds with oxygen in a homogeneous solution, using as the oxygen-carrying intermediate, a solution comprising a basic cupric salt complex of an amine selected from the group consisting of aliphatic, primary, secondary and tertiary amines and cyclic secondary and tertiary amines. Such cyclic amines include cycloaliphatic and aromatic amines in which the amine nitrogen forms part of the ring and cycloaliphatic amines in which the cycloaliphaitc group is a substituent on the amine nitrogen. Such amines are best described as amines having an amine nitrogen free of directly bonded aryl substituents.

In my copending application, Ser. No. 239,315, filed concurrently herewith, now U.S. Patent 3,300,456, which is a continuation-in-part of my application, Ser. No. 19,186, filed Apr. 1, 1960, and now abandoned, both of which are assigned to the same assignee as the present invention, I disclosed and claimed the self-condensation products obtained from organic compounds containing at least two terminal acetylenic or ethynyl groups (CH≡C—) by a process which comprises reacting these compounds with oxygen in a homogeneous solution in the presence of a dissolved oxygen-carrying intermediate comprising an amine-basic cupric salt complex.

I have now found that this same reaction is applicable to the preparation of polymers from diethynyl compounds having a hetero atom corresponding to the following formula

H—C≡C—R'—C≡C—M—C≡C—R'—C≡CH where M and R' are as previously defined. It would be expected that the preparation of these starting materials would merely involve the reaction of one mole of the dihalo derivative of M and a monometallo acetylide of the diethynyl hydrocarbon in the same way that bis(monohydrocarbon ethynyl) compounds have been prepared. However, I have found that it is not possible to prepare the monometallo acetylides of diethynyl compounds since the bis(metallo acetylide) of the diethynyl compound has been obtained even when one mole of a metal such as an alkali metal has been reacted with one mole of the diethynyl hydrocarbon. This evidently occurs because the bis(metallo acetylide) is insoluble in the solvent system, for example, tetrahydrofuran, ethyl ether, etc. These dimetallo derivatives of the diethynyl hydrocarbon should be expected to react with the dihalo derivative of M to produce a long chain polymer by itself. However, I have found that this reaction does not proceed to give polymers of high molecular weight, but rather proceeds to give a mixture of low molecular weight materials which appear to be a mixture of monomer, dimer, trimer, and higher polymers having up to perhaps, 15 units in the polymer molecule, with the average being from about 6 to 10 units. So far, I have been unable to produce high molecular weight polymers by this reaction. However, the low molecular weight polymers may be used alone in some of the applications described hereafter, or may be used as the starting material to form self-condensation or oxidatively coupled products by reaction with oxygen in a solution of the starting material also containing dissolved therein an oxygen-carrying intermediate comprising an amine-basic cupric salt complex, to produce high molecular weight polymers. This oxidative coupling reaction of the starting materials shows that the starting materials have two terminal ethynyl groups.

The reaction of acetylene in the presence of an aqueous solution of an ammoniacal cuprous compound to form vinyl and divinyl acetylene is well-known. This reaction is restricted to acetylene and is an addition reaction in which one triple bond is converted to a double bond for each acetylene added to the nucleus as illustrated by the following equation.

Although the above reaction is not applicable to substituted acetylenes, these latter materials in the presence of oxygen and an aqueous mixture of cuprous chloride and ammonium chloride will undergo a coupling reaction involving the oxidation of the acetylenic hydrogen of two acetylene groups to form water and a diacetylene compound. When the organic compound contains only one terminal acetylenic group, the compound is a disubstituted diacetylene. When the organic compound contains two terminal acetylenic groups (ethynyl groups), the compounds produced are linear and cyclic polyacetylenes of low molecular weight. In the reaction between an organic compound containing two terminal acetylenic groups in a pyridine solution in the presence of cupric acetate, the reaction proceeds in the absence of oxygen to form the cyclic dimers, trimers, tetramers, etc., of the polyacetylenes. Only small amounts of linear dimer are formed and then only if the starting material is 1,5-hexadiyne (HC≡C—CH₂CH₂—C≡CH). In all of these reactions, the time is exceedingly long and copper must be used in the ratio of at least one mole of copper for each mole of copper for each mole of acetylenic starting material, and usually is used in great excess. It is also known that monohydrocarbon-substituted acetylenes form the monometallo derivative (metallo acetylide) thereof since there is only one reactive hydrogen. These monometallo derivatives react with mono- and polyhalo derivatives of certain metals and semimetals to produce heteroacetylenic compounds having as many monohydrocarbon-substituted ethynyl groups as there are replaceable halo groups, according to the following series of equations:

wherein lithium is used as typical of the metals capable of forming the metallo acetylenic intermediates, R is a monovalent hydrocarbon, Q is a metal or semimetal, X is halogen and $p$ is the valence of Q.

I have now discovered that diethynyl hydrocarbons, i.e., having two H—C≡C— groups, will react with Grignard reagents or with Grignard-like reagents, such as alkyl and aryl metallo compounds, for example, phenyl lithium, etc., or directly with sodium or potassium, to form bis(metallo acetylides) which I can react with certain dihalo compounds to yield low molecular weight materials which still contain two terminal ethynyl groups which I can then oxidatively couple to form high molecular weight resinous materials. The dihalo materials which I have found capable of reacting with the dimetallo derivatives of the diacetylenic hydrocarbon are $HgX_2$, $RTlX_2$, $R_2SiX_2$, $R_2GeX_2$, $R_2SnX_2$, $R_2PbX_2$, $RPX_2$, $RAsX_2$, $RSbX_2$, $RBiX_2$, $SX_2$, $SeX_2$, $TeX_2$, $(R_3As)_2NiX_2$, $(R_3P)_2NiX_2$, $(R_3Sb)_2NiX_2$, $(R_3As)_2PdX_2$, $(R_3P)_2PdX_2$, $(R_3Sb)_2PdX_2$, $(R_3As)_2PtX_2$, $(R_3P)_2PtX_2$, and $(R_3Sb)_2PtX_2$, where X is halogen and R is a monovalent hydrocarbon, specific examples of which are given hereinafter.

When these dihalo compounds are reacted with a bis(metallo acetylide), the following reaction occurs using lithium as the typical metal which forms a dimetallo derivative with the diethynyl hydrocarbon, diethynyl benzene as the typical diethynyl hydrocarbon and dichlorodimethylsilane as the typical dihalo compound

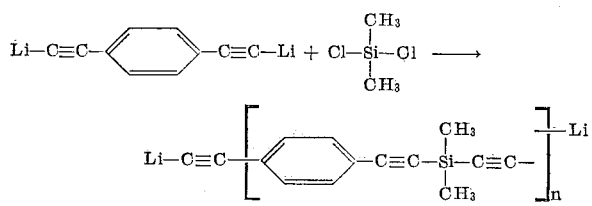

where $n$ is a positive integer representing the number of repeating units in the molecule in which the carbon atom in the acetylenic group is joined to the carbon atom in the phenylene radical. Subsequent hydrolysis during work-up of the polymer replaces the lithium with hydrogen atoms to give a compound corresponding to the following formula

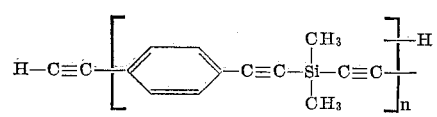

As stated previously, these materials are low molecular weight materials ranging all the way from the monomer having the formula

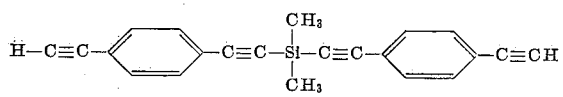

to compounds having up to 15 or more units all characterized by having two terminal ethynyl groups. The hexamer by way of illustration would have the formula

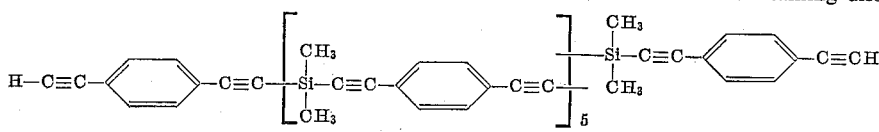

which may be further condensed to the following formula

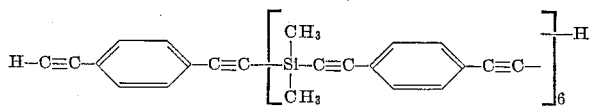

During the oxidative coupling reaction, the hydrogens on the terminal ethynyl groups are removed to produce self-condensation products of high molecular weight as shown in the following formula which shows the polymer which would be obtained by the oxidative coupling of the above hexamer

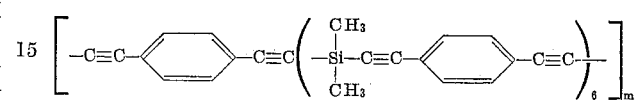

where $m$ represents the number of units joined together in the polymer molecule and is at least 2, but usually represents a value of at least 10 and is more probably at least 50.

It is to be understood that the oxidative coupling reaction is not a direct oxidation, but an oxidation involving participation of the copper catalyst system as an oxygen carrying intermediate.

The general method of preparing my starting materials is to prepare the bis(metallo acetylide) from the diethynyl hydrocarbon by the means well-known to those skilled in the art for the preparation of metallo derivatives of acetylenes. Because of the ready availability and ease of handling and its high reactivity, I generally use lithium which I react with a halobenzene to produce phenyl lithium which readily reacts with the diethynyl hydrocarbon to produce the dilithium derivative of the diethynyl hydrocarbon. Other halohydrocarbons may be used in place of the halobenzene and other well-known metals may be used to make the intermediate metallo hydrocarbon which is reacted with the diethynyl hydrocarbon. Since both of these are eliminated as by-products, their choice is based solely on convenience and availability. Sodium and potassium are reactive enough in themselves that they may be reacted directly with the diethynyl hydrocarbon without the necessity of forming the metallo organic intermediate.

These bis(metallo acetylide) derivatives of the diethynyl hydrocarbon, precipitate from solution, but readily react with the dihalo compound containing the hetero atom which it is desired to introduce into the acetylenic compound to produce the novel heteroacetylenic compounds of my invention. Some of the products are insoluble in organic solvents and are therefore incapable of further polymerization, but may be used in the applications discussed hereinafter, while those products which are soluble in organic solvents may be used per se as discussed hereinafter, or may be used as the starting materials in the oxidative coupling reaction to produce polymers of higher molecular weight. Those compounds which tend to be insoluble in organic solvents are those prepared from divalent metal halides, for example, mercuric chloride, and a diethynyl hydrocarbon where the hydrocarbon chain is of relatively short length, i.e., up to 4 to 6 carbon atoms. However, soluble materials may be prepared from divalent metal halides by using diethynyl hydrocarbons where the hydrocarbon chain is relatively long, i.e., 8 or more carbon atoms.

The general method of carrying out my oxidative coupling reaction is to pass an oxygen-containing gas through a solution of one or more of the soluble, heteroacetylenic compounds each containing two ethynyl groups, the solution also containing dissolved therein an oxygen-carrying intermediate comprising an amine-basic cupric salt complex.

In providing the catalyst comprising a basic cupric salt and an amine, the particular copper salt used has no effect on the type of product obtained. I may start with either a cuprous or a cupric salt. The only requirement is that, if a cuprous salt is used, it must be capable of existing in the cupric state and must form a complex with the amine that is soluble in the reaction medium. The necessity for being able to exist in the cupric state is based on my belief that the oxidation of the terminal acetylenic group is accomplished by the oxygen reacting with the amine-cuprous salt complex to form an intermediate activated amine-basic cupric salt complex that reacts with the ethynyl groups of the heteroacetylenic compound to form an unstable intermediate which decomposes forming the self-condensation product of the heteroacetylenic compound and water as the products and regenerates the amine-cuprous salt complex. This activated complex can also be formed by starting originally with a cupric salt in making the copper-amine complex, for example, by using a reducing agent which unites with the liberated anion and forms the cuprous salt in situ, e.g., copper metal. However, more simple methods may be used, for example, the activated complex may be formed by adding cupric hydroxide to a cupric salt, adding a base to a cupric salt, adding an alkali metal derivative of the heteroacetylenic compound being oxidatively coupled, by treating a cupric salt with an ion-exchange resin having exchangeable hydroxyl groups, etc. Preferably, these reactions are carried out in the presence of the amine to prevent precipitation of the basic cupric salt, but it is possible to add the amine later to dissolve the basic cupric salt even as a precipitate. As will be explained in more detail later, the amount of hydroxyl ion introduced into the complex should not be sufficient to convert the cupric salt to cupric hydroxide unless additional cupric salt is added later.

Typical examples of the copper salts suitable for my process are cuprous chloride, cupric chloride, cuprous bromide, cupric bromide, cuprous sulfate, cupric sulfate, cuprous azide, cupric azide, cuprous tetraammine sulfate, cupric tetraamine sulfate, cuprous acetate, cupric acetate, cuprous propionate, cupric butyrate, cuprous palmitate, cupric laurate, cuprous benzoate, cupric toluate, etc. Cuprous chloride, cupric chloride, cuprous bromide, cupric bromide, cuprous azide, and cupric azide, produce the highest molecular weight polymers. Although cupric sulfite is not known, cuprous sulfite can be used because it evidently is oxidized to cuprous sulfate. Copper salts such as cuprous iodide, cuprous sulfide, cupric sulfide, cuprous cyanide, cuprous thiocyanate, etc., are not suitable for use in my process, since they are either not soluble in tertiary amines or are not capable of existing as stable cupric salts. For example, cupric cyanide and cupric thiocyanate autogeneously decompose to the corresponding cuprous salt. Cuprous nitrate and cuprous fluoride are not known to exist but the amine complexes can be made in situ. Substitution of cupric chloride, cupric sulfate, cupric perchlorate and cupric nitrate for the cuprous salt, without first converting them to the corresponding basic cupric salt, gave no oxidation of the heteroacetylenic compounds in the presence of a tertiary amine.

Examples of amines which are free of aryl substituents directly bonded to the amine nitrogen that may be used in practicing my invention are the aliphatic amines, including cycloaliphatic amines wherein the cycloaliphatic group is substituted on the amine nitrogen, for example, mono-, di- and trimethylamine,
mono-, di- and triethylamine,
mono-, di- and tripropylamine,
mono-, di- and tributylamine,
mono-, di- and trisecondary propylamine,
mono-, di- and tribenzylamine,
mono-, di- and tricyclohexylamine,
mono-, di- and triethanolamine,
ethylmethylamine,
methylpropylamine,
allylethylamine,
methylcyclohexylamine,
morpholine,
methyl-n-butylamine,
ethylisopropylamine,
benzylmethylamine,
octylbenzylamine,
octylchlorobenzylamine,
methylcyclohexylamine,
methylphenethylamine,
benzylethylamine,
di(chlorophenethyl)amine,
1-methylamino-2-phenylpropane,
1-methylamino-4-pentene,
N-methyldiethylamine,
N-propyldimethylamine,
N-allyldiethylamine,
3-chloro-N,N'-dimethylpropylamine,
N-butyldimethylamine,
N-isopropyldiethylamine,
N-benzyldimethylamine,
N-benzyldioctylamine,
N-chlorobenzyldioctylamine,
N-cyclohexyldimethylamine,
N-phenethyldimethylamine,
N-benzyl-N-methylethylamine,
N-bromobenzyl di(chlorophenethyl)amine,
N,N-dimethyl-2-phenylpropylamine,
N-dimethyl-4-pentenyl amine,
N,N-diethyl-2-methylbutyl amine, etc.

When aliphatic amines are used, I prefer that the aliphatic groups be straight chain hydrocarbon groups.

Examples of cyclic amines are the pyridines, such as pyridine itself, $\alpha$-, $\beta$- and $\gamma$-collidine, $\alpha$-, $\beta$-, and $\gamma$-picoline, and 2,4-, 2,5-, 2,6- and 3,4-lutidine, quinuclidine, the dipyridyls, the pyrroles, the pyrrolidines, the piperidines, the diazoles, the triazoles, the diazines, the triazines, the quinolines, the isoquinolines, the tetrahydroquinolines, the tetrahydroisoquinolines, the phenantholines, the morpholines, etc., including the ring-substituted products of these cyclic amines whereby one or more of the hydrogen atoms on the carbons forming the ring are substituted by groups which may be aliphatic (for example, methyl, ethyl, vinyl, propyl, propenyl, butyl, amyl, hexyl, heptyl, octyl, etc., and isomers and the homologues thereof), alkoxy (for example, methoxy, ethoxy, vinoxy, propoxy, propenoxy, butoxy, etc., and isomers and homologues thereof), aryl (for example, phenyl, tolyl, dimethylphenyl, chlorophenyl, bromotolyl, naphthyl, chlorobromonaphthyl, etc., and isomers and homologues thereof), aryloxy (for example, phenoxy, toloxy, xyloxy, chlorophenoxy, naphthoxy, etc., and isomers and homologues thereof), and the like. The ring substituents may be the same or different hydrocarbon groups. It is understood that secondary cyclic amines, e.g., piperidines, pyrroles, pyrrolidines, tetrahydroquinolines, tetrahydroisoquinolines, may be used in the form of tertiary amines whereby an alkyl hydrocarbon radical, such as those listed above for the ring substituents, is also attached to the amine nitrogen group, e.g., N-methylpyrrole,
N-methyl tetrahydroquinoline,
N-methyl tetrahydroisoquinoline,
N-methyl piperidine,
N-methyl pyrrolidine,
N-methylimidazole,
N-methyl-1,2,4-triazole,
N-decylpiperidine,
N-decylpyrrolidine,
N-isobutylpiperidine, 1-decyl-2-methylpiperidine,
N-isopropylpyrrolidine,
N-cyclohexylpiperidine, etc.

In general, primary, secondary, tertiary, mixed primary-secondary, mixed primary-tertiary or mixed secondary-tertiary polyamines would behave in the same way as primary, secondary and tertiary monoamines in my reaction, except of course, the amount used would only have to be that amount necessary to give the equivalent amount of amino groups. I may use polyamines wherein two or more tertiary amine groups, of the kind listed above for the monoamines, are attached to the aliphatic or cycloaliphatic nucleus, e.g., ethylene, diethylene amine, propylene, butylene, pentylene, hexylene, cyclopentylene, cyclohexylene, etc. Typical examples of these aliphatic polyamines are the N,N'-dialkylethylenediamines,
N,N,N'-trialkylethylenediamine,
propanediamine,
ethylenediamine,
the N-alkylethylenediamines,
the N-alkylpropanediamines,
the N,N'-dialkylpropanediamines,
the N,N,N'-trialkylpropanediamines,
propanediamine,
the N-alkylpropanediamines,
the N,N'-dialkylbutanediamines,
pentanediamine,
the N-alkylpentanediamines,
the N,N'-dialkylpentaenediamines,
the N,N,N'-trialkylpentanediamines,
diethylenetriamine,
the N-alkyldiethylenetriamines,
the N'-alkyldiethylenetriamines,
the N,N',N''-trialkyldiethylenetriamines,
the N,N',N'-trialkyldiethylenetriamines,
the N,N',N',N''-tetraalkyldiethylenetriamines,
the N',N',N'',N''-tetraalkyldiethylenetriamines,
the cyclohexylenediamines, etc.

Likewise, the polyamines may be mixed aliphatic and cyclic amines, e.g., aminoalkylpyridines, alkylaminoalkylpyridines, etc. I have, however, discovered that those polyamines which have only two or three aliphatic or cycloaliphatic carbon atoms separating the two primary or secondary amino nitrogens represent a class of polyamines which are strong chelating agents and form complexes with the copper salt which so completely envelop the copper that the complex is less reactive than the other aliphatic primary or secondary amines in the oxidation reaction. Because of this, I prefer, when using primary or secondary amines, to use primary and secondary monoamines. However, this is not true of tertiary polyamines. Typical examples of such tertiary amines are N,N,N',N'-tetramethylethylenediamines,
N,N,N',N'-tetraethylethylenediamines,
N,N,N',N'-tetrapropylethylenediamine,
N,N,N',N'-tetrabutylethylenediamine,
N-butyl-N-octyl-N',N'-dimethylethylenediamine,
$N^1,N^1$-dibenzyl-$N^2,N^2$-dimethyl-1,2-propanediamine,
2-chloro-N,N,N',N'-tetraethyl-1,3-propanediamine,
N'-(3-chloro-p-tolyl)-N,N-diethyl-N'-methyl-1,3-propanediamine,
2-(β-dimethylaminoethyl)-pyridine,
N,N,N',N'-tetrabenzyl-3-butene-1,2-diamine,
N,N,N',N'-tetramethyl-2-butyne-1,4-diamine,
N,N,N',N'-tetraallylputrescine,
N,N,N',N'-tetramethyl-1,4-diphenylputrescine,
N,N,N',N'-tetraisopropyl-1,3-butanediamine,
N,N,N',N'-tetramethyl-1,3-cyclopentanediamine,
N,N,N',N'-tetramethyl-1,4-cyclohexanediamine, etc.,
N-ethyl-N,N',N'-trimethylethylenediamine,
N-methyl-N,N',N'-triethylethylenediamine,
N,N,N',N'-tetramethyl-1,3-propanediamine,
N,N-dimethyl-N',N'-diethylethylenediamine,
1,2-bis(2-methylpiperidino)ethane,
N,N,N',N'-tetra-n-hexylethylenediamine,
N,N,N',N'-tetra-n-amylethylenediamine,
1,2-bispiperidinoethane,
N,N,N',N'-tetraisobutylethylenediamine,
N,N,N',N'-tetramethyl-1,3-butanediamine,
N,N,N',N'-tetramethyl-1,2-cyclohexanediamine,
1,2-bis(2,6-dimethylpiperidino)ethane,
N,N-didecyl-N',N'-dimethylethylenediamine,
N-methyl,
N',N',N'',N''-tetraethyldiethylenetriamine,
N-decyl-N,N',N'-triethylethylenediamine,
2-(β-piperidinoethyl)pyridine,
2-(β-dimethylaminoethyl)-6-methylpyridine,
2-(β-dimethylaminoethyl)pyridine,
2-(β-morpholinoethyl)pyridine, etc.

In general, tertiary amines are more oxidatively stable than primary and secondary amines. Also, my studies have shown that tertiary amines form a complex which is a more active catalyst for the oxidative coupling reaction forming the basis of this application. Therefore, I prefer tertiary amines as the amine to be used in forming the amine-basic cupric salt complex. I have found that a particularly active catalyst is formed by using a diamine in which the two tertiary amine groups are separated by two or three carbon atoms, numerous examples of which have been given above.

Many factors affect the stability of the complex of the amine and the copper salt. These factors are well-known in the art and are discussed in detail in such texts as "The Chemistry of the Coordination Compounds," edited by John C. Bailar, Jr., Reinhold Publishing Corp., New York, 1956, see for example, pages 174 to 190; and "Mechanisms of Inorganic Reactions," Fred Basolo and Ralph G. Pearson, John Wiley and Sons, Inc., New York, 1958, see for example, pages 14–24. As pointed out in the latter text on page 18, one of the major factors influencing stability is the basicity of the ligand. I have found that apparently the ability to form a stable complex as indicated by the basicity of the amines I use as ligand also is an indication of the activity of the catalyst. Those amines which are strong bases form more active catalysts than amines which are weak bases. When the latter are used, typical examples of which are 3,5-diphenylpyridine, phenanthridine, etc., I find that heating of the reaction mixture is desirable to cause the self-condensation reaction to proceed rapidly.

The effect of an N-aryl group in amines, e.g., aniline, N-methylaniline, N,N-dimethylaniline, methyldiphenylamine, etc., is to reduce the basicity of the amine so that its ability to form the copper complex is greatly reduced. Further, the stability of the amine under oxidizing conditions is greatly reduced. Because of these two effects I prefer to use amines which are free of N-aryl substituents.

Some of the diethynyl hydrocarbons which may be used to form the dimetallo derivative to produce the novel heteroacetylenic compounds of this invention include 1,4-pentadiyne, 1,5-hexadiyne, 1,7-octadiyne, 1,11-dodecadiyne, 1,17-octadecadiyne, the diethynylbenzenes, for example, o-diethynylbenzene, m-diethynylbenzene, p-diethynylbenzene, the diethynyltoluenes, the diethynylnaphthalenes, the diethynylanthracenes, 1,7,13,19-eicosatetrayne, etc. It will be noticed that all of these compounds are characterized by having two ethynyl groups and other compounds having two ethynyl groups may likewise be used.

These diethynyl hydrocarbons may be reacted to form the bis(metallo acetylide) by processes well known in the art, for example, "The Chemistry of Acetylenes," J. A. Nieuwland and R. R. Vogt, Reinhold Publishing Corporation, New York, 1945, pages 40–70 and the references cited therein. Since the metallic atom is eliminated as a by-product in the reaction with a dihalo compound containing the desired hetero atom, there is no advantage in using one metal over the other. However, since lithium is readily available, is very reactive and yet is not dangerous to handle, it is a convenient metal for use in preparing the metallo derivatives of the diethynyl compounds. This may be done, for example, by reacting lithium with a halohydrocarbon, for example, bromobenzene, in an anhydrous non-reactive solvent, for example, diethyl ether, to form phenyllithium. The reaction is usually carried out at the reflux temperature until all of the lithium dissolves, precautions being taken to prevent moisture of the air from re-entering the reaction vessel, for example, by use of a desiccant. Oxygen is reactive with the products and is excluded either by vaporization of the solvent or by use of an inert gas, e.g., nitrogen. After all of the lithium metal has dissolved, the solution is usually, but not necessarily, filtered to remove precipitated lithium bromide, and the diethynyl compound added. Even though one mole of phenyl lithium is added for each mole of diethynyl hydrocarbon, the dilithium derivative precipitates from the solution and, therefore, two moles of phenyl lithium should be added for each mole of diethynyl compound.

The dimetallo derivative of the diethynyl compound readily reacts with the dihalo compound having the hetero atom that it is desired to introduce into the compounds of this invention. Here again, since the halo atom is eliminated as a lithium halide, the particular halo atom used is not important. For convenience's sake, and because they are more readily available and cheaper in cost, I prefer to use the dichloro derivative although the dibromo, diiodo or difluoro compounds may also be used. Typical of the dihalo compounds are those corresponding to the formulas

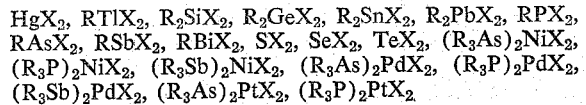

and

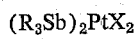

where X is a halogen and R is a monovalent hydrocarbon. Typical of the monovalent hydrocarbon radicals represented by R are methyl, ethyl, propyl, butyl, vinyl, allyl, hexyl, octyl, decyl, octadecyl, cyclohexyl, cycloheptyl, phenyl, naphthyl, tolyl, xylyl, ethylphenyl, phenylethyl, benzyl, etc. Specific examples corresponding to these formulas, by way of example, are mercuric chloride,
mercuric bromide,
mercuric iodide,
mercuric fluoride,
methylthallium dichloride,
ethylthallium diiodide,
phenylthallium dichloride,
dichlorodimethylsilane,
dibromodiethylsilane,
dichloromethylphenylsilane,
dichloroethylmethylsilane,
dichlorodiphenylsilane,
dichlorodihexylsilane,
dichlorodicyclohexylsilane,
dichlorodi-(phenylethyl)silane,
diiododimethylsilane,
dibromodiethylsilane,
difluorodipropylsilane,
dichlorodivinylsilane,
diallyldichlorosilane,
dichlorodimethylgermane,
dibromodiethylgermane,
dichloromethylphenylgermane,
dichloroethylmethylgermane,
dichlorodiphenylgermane,
dichlorodihexylgermane,
dichlorodicyclohexylgermane,
dichlorodi-(phenylethyl)germane,
diiododimethylgermane,
dibromodiethylgermane,
difluorodipropylgermane,
dichlorodivinylgermane,
diallyldichlorogermane,
dichlorodimethylstannane,
dibromodiethylstannane,
dichloromethylphenylstannane,
dichloroethylmethylstannane,
dichlorodiphenylstannane,
dichlorodihexylstannane,
dichlorodicyclohexylstannane,
dichlorodi-(phenylethyl)stannane,
diiododimethylstannane,
dibromodiethylstannane,
difluorodipropylstannane,
dichlorodivinylstannane,
diallyldichlorostannane,
dichlorodimethylplumbane,
dibromodiethylplumbane,
dichloromethylphenylplumbane,
dichloroethylmethylplumbane,
dichlorodiphenylplumbane,
dichlorodihexylplumbane,
dichlorodicyclohexylplumbane,
dichlorodi-(phenylethyl)plumbane,
diiododimethylplumbane,
dibromodiethylplumbane,
difluorodipropylplumbane,
dichlorodivinylplumbane,
diallyldichloroplumbane,
dichloromethylphosphine,
dibromomethylphosphine,
diiodomethylphosphine,
difluoromethylphosphine,
dichloroethylphosphine,
dibromopropylphosphine,
butyldichlorophosphine,
dichlorooctylphosphine,
dichlorohexadecylphosphine,
dichlorovinylphosphine,
allyldichlorophosphine,
dichlorophenylphosphine,
dichlorotolylphosphine,
dichloroxylylphosphine,
dichloroethylphenylphosphine,
(allylphenyl)dichlorophosphine,
dichloronaphthylphosphine,
dichloro(phenylethyl)phosphine,
dichlorocyclohexylphosphine,
dichloromethylarsine,
dibromomethylarsine,
diiodomethylarsine,
difluoromethylarsine,
dichloroethylarsine,
dibromopropylarsine,
butyldichloroarsine,
dichlorooctylarsine,
dichlorohexadecylarsine,
dichlorovinylarsine,
allyldichloroarsine,
dichlorophenylarsine,
dichlorotolylarsine,
dichloroxylylarsine,
dichloro(ethylphenyl)arsine,
dichloro(allylphenyl)arsine,
dichloronaphthylarsine,
dichloro(phenylethyl)arsine,
dichlorocyclohexylarsine,
dichloromethylstibine,
dibromomethylstibine,
diiodomethylstibine, difluoromethylstibine,
dichloroethylstibine,
dibromopropylstibine,
butyldichlorostibine,
dichlorooctylstibine,
dichlorohexadecylstibine,
dichlorovinylstibine,
allyldichlorostibine,
dichlorophenylstibine,
dichlorotolylstibine,
dichloroxylylstibine,
dichloro-(ethylphenyl)stibine,
(allylphenyl)dichlorostibine,
dichloronaphthylstibine,
dichloro(phenylethyl)stibine,
dichlorocyclohexylstibine,
dichloromethylbismuthine,
dibromomethylbismuthine,
diiodomethylbismuthine,
difluoromethylbismuthine,
dichloroethylbismuthine,
dibromopropylbismuthine,
butyldichlorobismuthine,
dichlorooctylbismuthine,
dichlorohexadecylbismuthine,
dichlorovinylbismuthine,
allyldichlorobismuthine,
dichlorophenylbismuthine,
dichlorotolylbismuthine,
dichloroxylylbismuthine,
dichloro(ethylphenyl)bismuthine,
(allylphenyl)dichlorobismuthine,
dichloronaphthylbismuthine,
dichloro(phenylethyl)bismuthine,
dichlorocyclohexylbismuthine,
sulfur dichloride,
sulfur difluoride,
selenium dichloride,
tellurium dichloride,
bis(trimethylphosphine)dichloronickel,
bis(trimethylphosphine)dibromonickel,
bis(trimethylphosphine)diiodonickel,
bis(trimethylphosphine)difluoronickel,
bis(triethylphosphine)dichloronickel,
bis(tripropylphosphine)dichloronickel,
bis(tributylphosphine)dichloronickel,
bis(dimethylethylphosphine)dichloronickel,
bis(diethylmethylphosphine)dichloronickel,
bis(ethylmethylpropylphosphine)dichloronickel,
bis(triphenylphosphine)dichloronickel,
bis(trimethylarsine)dichloronickel,
bis(trimethylarsine)dibromonickel,
bis(trimethylarsine)diiodonickel,
bis(trimethylarsine)difluoronickel,
bis(triethylarsine)dichloronickel,
bis(tripropylarsine)dichloronickel,
bis(tributylarsine)dichloronickel,
bis(dimethylethylarsine)dichloronickel,
bis(diethylmethylarsine)dichloronickel,
bis(ethylmethylpropylarsine)dichloronickel,
bis(triphenylarsine)dichloronickel,
bis(trimethylstibine)dichloronickel,
bis(trimethylstibine)dibromonickel,
bis(trimethylstibine)diiodonickel,
bis(trimethylstibine)difluoronickel,
bis(triethylstibine)dichloronickel,
bis(tripropylstibine)dichloronickel,
bis(tributylstibine)dichloronickel,
bis(dimethylethylstibine)dichloronickel,
bis(diethylmethylstibine)dichloronickel,
bis(ethylmethylpropylstibine)dichloronickel,
bis(triphenylstibine)dichloronickel,
bis(trimethylphosphine)dichloropalladium,
bis(trimethylphosphine)dibromopalladium,
bis(trimethylphosphine)diiodopalladium,
bis(trimethylphosphine)difluoropalladium,
bis(triethylphosphine)dichloropalladium,
bis(tripropylphosphine)dichloropalladium,
bis(tributylphosphine)dichloropalladium,
bis(dimethylethylphosphine)dichloropalladium,
bis(diethylmethylphosphine)dichloropalladium,
bis(ethylmethylpropylphosphine)dichloropalladium,
bis(triphenylphosphine)dichloropalladium,
bis(trimethylarsine)dichloropalladium,
bis(trimethylarsine)dibromopalladium,
bis(trimethylarsine)diiodopalladium,
bis(trimethylarsine)difluoropalladium,
bis(triethylarsine)dichloropalladium,
bis(tripropylarsine)dichloropalladium,
bis(tributylarsine)dichloropalladium,
bis(dimethylethylarsine)dichloropalladium,
bis(diethylmethylarsine)dichloropalladium,
bis(ethylmethylpropylarsine)dichloropalladium,
bis(triphenylarsine)dichloropalladium,
bis(trimethylstibine)dichloropalladium,
bis(trimethylstibine)dibromopalladium,
bis(trimethylstibine)diiodopalladium,
bis(trimethylstibine)difluoropalladium,
bis(triethylstibine)dichloropalladium,
bis(tripropylstibine)dichloropalladium,
bis(tributylstibine)dichloropalladium,
bis(dimethylethylstibine)dichloropalladium,
bis(diethylmethylstibine)dichloropalladium,
bis(ethylmethylpropylstibine)dichloropalladium,
bis(triphenylstibine)dichloropalladium,
bis(trimethylphosphine)dichloroplatinum,
bis(trimethylphosphine)dibromoplatinum,
bis(trimethylphosphine)diiodoplatinum,
bis(trimethylphosphine)difluoroplatinum,
bis(triethylphosphine)dichloroplatinum,
bis(tripropylphosphine)dichloroplatinum,
bis(tributylphosphine)dichloroplatinum,
bis(dimethylethylphosphine)dichloroplatinum,
bis(diethylmethylphosphine)dichloroplatinum,
bis(methylethylpropylphosphine)dichloroplatinum,
bis(triphenylphosphine)dichloroplatinum,
bis(trimethylarsine)dichloroplatinum,
bis(trimethylarsine)dibromoplatinum,
bis(trimethylarsine)diiodoplatinum,
bis(trimethylarsine)difluoroplatinum,
bis(triethylarsine)dichloroplatinum,
bis(tripropylarine)dichloroplatinum,
bis(tributylarsine)dichloroplatinum,
bis(dimethylethylarsine)dichloroplatinum,
bis(diethylmethylarsine)dichloroplatinum,
bis(ethylmethylpropylarsine)dichloroplatinum,
bis(triphenylarsine)dichloroplatinum,
bis(trimethylstibine)dichloroplatinum,
bis(trimethylstibine)dibromoplatinum,
bis(trimethylstibine)diiodoplatinum,
bis(trimethylstibine)difluoroplatinum,
bis(triethylstibine)dichloroplatinum,
bis(tripropylstibine)dichloroplatinum,
bis(tributylstibine)dichloroplatinum,
bis(dimethylethylstibine)dichloroplatinum,
bis(diethylmethylstibine)dichloroplatinum,
bis(ethylmethylpropylstibine)dichloroplatinum,
bis(triphenylstibine)dichloroplatinum, etc.

When the bis(metallo acetylide) from a diethynyl hydrocarbon is reacted with the dichloro compound, polymeric materials are produced as stated hereinbefore. Those products which are soluble in solvents may be further oxidatively coupled to produce higher molecular weight polymers by reacting the low molecular weight polymers with oxygen in solution also containing dissolved therein an oxygen-carrying intermediate comprising an amine-basic cupric salt complex.

Although I do not want to be bound by my theory, I believe that one mole of a copper salt forms a complex with two moles of amine nitrogen in the amine, e.g., a mole of monoamine has one mole of amine nitrogen, a diamine has two moles of amine nitrogen, etc. However, it is possible to carry out my reaction with as little as 0.66 mole of amine nitrogen to one mole of copper. However, it may be that in this case only part of the copper is complexed or polynuclear complexes may form. The complex formed from a cuprous salt and a tertiary amine can react with oxygen to form an oxidized intermediate while the complex formed from a cupric salt is already in the form of the oxidized intermediate which in some manner can form a complex with the heteroacetylenic compound. This latter complex activates the heteroacetylenic group in some way so that self-condensation occurs between heteroacetylenic groups on different molecules, with the regeneration of the catalyst in the reduced or cuprous state which can react with additional oxygen to form the active oxidized intermediate. This belief is based on the fact that, if I pass oxygen into my catalyst system prepared from a cuprous salt until it is saturated or treat one equivalent of a cupric salt with one equivalent of a base and then add the heteroacetylenic compound, with no further addition of oxygen one mole of heteroacetylenic compound having two ethynyl groups is oxidized for two moles of catalyst present. By such a reaction, I can cause the self-condensation of heteroacetylenic compounds without actually passing oxygen into the reaction system containing the heteroacetylenic reactant. These reactions are illustrated by the following equations using $HC{\equiv}C{-}Y{-}C{\equiv}CH$, where Y represents the $-R-C{\equiv}C-M-C{\equiv}C-R$ nucleus previously defined, to represent the heteroacetylenic compound and (A) to represent a monoamine, KOH as representative of a typical base and CuCl and CuCl$_2$ as representative of typical cuprous and cupric salts.

*Preparation of amine-basic cupric salt complex*

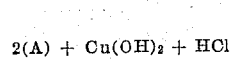
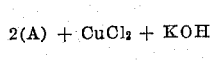
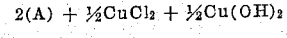

*Reaction with the heteroacetylenic compound*

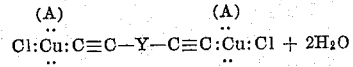
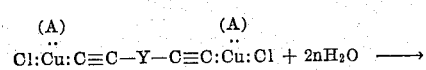
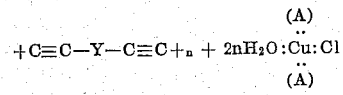

where $n$ is the number of units making up the polymer molecule. It will be noted that although the above is theoretical it does provide indications as to the role of water in determining the nature of the product and how the complex is regenerated and acts as the oxygen-carrying intermediate. Since water is a product of the reaction and completely anhydrous reagents are extremely difficult to obtain, I have never found it necessary to actually add water to the reaction mixture even when starting with a cuprous salt.

As will be evident from the above equations, it is desirable when starting with a cupric salt to add one equivalent of base for each mole of copper salt to most effectively use all of the copper. If less base is used then only the equivalent amount of copper salt is converted to the catalytically active amine-basic cupric salt complex leaving the balance of the cupric salt unchanged which even in the form of its amine complex is an inactive ingredient in the system. Likewise, if more than one equivalent of base is added, then some or all of the cupric salt is converted into cupric hydroxide which likewise is an inactive ingredient even in the form of its amine complex. In effect, the addition of more or less than one equivalent of base, i.e., one mole of hydroxyl ion, to a mole of cupric salt results in the same effect as though less of the cupric salt has been used to form the amine-basic cupric salt complex. This same effect is noted if more than one equivalent of acid, i.e., one mole of hydrogen ions or one mole of a cupric salt is added to one mole of cupric hydroxide in forming the complex.

The cupric salts of carboxylic acids, for example, cupric acetate, cupric benzoate, etc., represent a unique class of cupric salts. They will form a complex with amines which, in the presence of oxygen, will produce heteroacetylenic products but these products are much lower in molecular weight and the reaction is slower than if the cupric carboxylate had been converted to the corresponding amine-basic cupric carboxylate complex. Evidently because of the weakly acidic nature of carboxylic acids, the heteroacetylenic compound and the cupric carboxylate complex are in equilibrium with the heteroacetylenic complex and the carboxylic acid according to the following equation where again $HC{\equiv}C{-}Y{-}C{\equiv}CH$ represents the heteroacetylenic compound, AcO represents the carboxylate ion and (A) represents a monoamine:

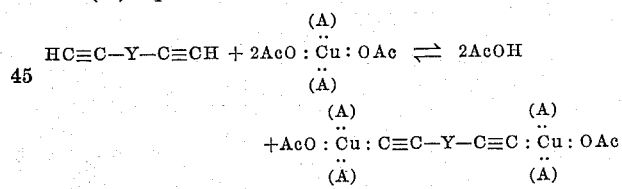

Apparently the equilibrium is predominantly to the left-hand side of the equation, since the slow reaction indicates a low concentration of the active species.

It will be noted that this heteroacetylenic-cupric complex on the right-hand side of the equation is the same as would be obtained from a cuprous salt and oxygen or a cupric salt and a base when reacted with a heteroacetylenic compound in a non-equilibrium reaction. In the specification and claims, I use the term "amine-basic cupric salt complex" to denote the catalytically active complex described above which acts or is used as the oxygen-carrying intermediate in the oxidation of the heteroacetylenic compounds to self-condensation products. As shown above, this complex can be obtained either from cuprous or cupric salts and oxidizes the heteroacetylenic compounds to self-condensation products while the copper in the complex is reduced to the cuprous state.

If the quantity of heteroacetylenic compound to be reacted is greater than can be oxidized by the amount of complex present, oxygen is introduced into the reaction mixture to re-oxidize the cuprous complex back to the basic cupric complex. Whether this is done or whether the stoichiometric amount of the amine-basic cupric salt complex is used to oxidize the heteroacetylenic compound, the net overall reaction in either case is the reaction of oxygen, either elemental or from the complex, with the heteroacetylenic compound. This reaction, therefore, may best be described as the reaction of heteroacetylenic compounds containing two ethynyl groups with oxygen using the amine-basic cupric complex as the oxygen-carrying intermediate.

I may use mixtures of amines and mixtures of copper salts for forming my catalyst system. The copper-amine complex is usually dissolved in the solvent before the heteroacetylenic compound is added or when an amine is used as solvent it may be formed in situ. In some cases, the solution of the copper-amine complex may be hastened by heating the mixture, by bubbling in air or oxygen, or a combination thereof. In order to effectively use all of the copper, enough amine should be added to complex and thereby dissolve all of the added copper salt. Larger excesses of amine do not adversely affect the reaction, and in some cases, may be desirable in order to completely dissolve all of the heteroacetylenic compound reactant and to act as the solvent for the reaction product. Other solvents such as alcohols, ketones, hydrocarbons, chlorohydrocarbons, nitrohydrocarbons, ethers, esters, amides, mixed ether esters, sulfoxides, etc., may be present in the reaction system providing they do not interfere or enter into the oxidation reaction.

Oxygen or an oxygen-containing gas is bubbled into the reaction mixture causing an exothermic reaction to take place with the formation of water as a by-product. It is preferable to prevent the escape of this water of reaction from the reaction vessel when carrying out the reaction by the batch process or to control the escape of water so that there is always one mole of water present for each mole of copper catalyst when carrying out the reaction by the batch or continuous process. This can be done by carrying out the reaction under reflux conditions, in a closed reaction system at superatmospheric pressure, by cooling, in the presence of desiccants, or any combination thereof, with a controlled removal of water if desired. This can be done, for example, by sweeping with an inert gas, by carrying out the reaction at subatmospheric pressure, by azeotropic distillation, by the use of open reaction vessels, by heat or any combination thereof. In carrying out my reaction, the oxygen can be diluted with an inert gas such as nitrogen, helium, argon, etc., or air can be used. By controlling the ratio of oxygen to inert gas and the inlet temperature of this mixture, I can conveniently sweep the reaction mixture to cause removal of the water as it is formed if desired.

Since the reaction is usually exothermic, the reaction can become overheated, resulting in the formation of undesirable products. Generally, I initiate the oxidation reaction at as low a temperature as the reaction will start, as evidenced by the reaction becoming exothermic. Usually, I control my oxidation reaction so that the maximum temperature does not exceed 100° C., and preferably does not exceed 80° C. The heat of reaction may be removed, for example, by radiation, convection, or by cooling coils which can either be immersed in or surround the reaction vessel.

Ordinarily, I continue the passage of oxygen into the reaction mixture until no more heat is generated or the desired amount of oxygen is absorbed. Alternatively, I may intermittently or continuously add the same or a different heteroacetylenic compound than the starting material during the oxidative coupling reaction, to produce a mixed polymeric heteroacetylene which has a different structure than if the mixed heteroacetylenic compounds were used as starting materials. To terminate the reaction, I destroy the catalyst system by the addition of an acid, preferably a mineral acid such as hydrochloric or sulfuric acid, which reacts with the amine and copper salt, or I remove the product from the presence of the catalyst either by filtering off the product if it has precipitated, or by pouring the reaction mixture into a material which is a solvent for the catalyst system but a non-solvent for the product. Alternatively, I may precipitate the copper as an insoluble compound and filter it from the solution prior to isolating the product, or I may add a chelating agent which inactivates the copper. After the product is precipitated, it may be redissolved and re-precipitated any desirable number of times to remove the impurities if they are soluble materials.

Both the polymeric products produced by the reaction of the dichloro compound and the bis(metalloacetylide) of the diethynyl hydrocarbon and the polymers prepared by oxidatively coupling such materials may be fabricated into various shapes under pressure using heat if desired, and those which are soluble may be dissolved in solvents to prepare solutions which can be used in the preparation of coatings, fibers, etc.; for example, they may be dissolved in chlorobenzene, nitrobenzene, and chlorinated hydrocarbons, such as tetrachloroethylene. When these solutions are cast, for example, on a glass plate and the solvent evaporated, they produce transparent films whose toughness depends on the molecular weight, those of the higher molecular weight being tough and flexible. All of these materials when heated rapidly to a high temperature or ignited with a flame, burn vigorously to leave a coherent, carbonaceous film containing the hetero atom. When the polymers are gradually heated to control this vigorous decomposition reaction, they can be used to deposit a very coherent and useful carbonaceous film containing the hetero atom as part of the film, to produce conductive films of interesting properties because of the presence of the hetero atom. The carbonization of this film can be carried out while measuring the resistivity which will gradually decrease during the heating step as the temperature is raised. When a finite desirable value is obtained, the heating may be discontinued by rapidly cooling and the film will maintain the resistivity value it had when the heating was stopped. If such a film is now incorporated into a vacuum system such as a highly evacuated glass envelope, the film will maintain the resistivity value it has even though heated to a temperature higher than the temperautre at which it was heated in air.

In carrying out the oxidative coupling reaction, the polymers can be chain-stopped to control molecular weight by inclusion of an organic compound containing a single ethynyl group.

These compounds may be stabilized against thermal decomposition by reacting them with materials which are capable of reacting with the triple bond of acetylenic groups; for example, they may be hydrogenated or halogenated to produce saturated derivatives of wide utility in which the polymer molecule still retains the hetero atom of the acetylenic polymer.

In order that those skilled in the art may better understand my invention, the following examples are given which are illustrative of the practice of my invention and are not intended for purposes of limitation. In the examples, all parts are by weight, unless stated otherwise.

*Example 1*

In a reaction vessel equipped with a reflux condenser, and blanketed with dry nitrogen, 1.4 grams of lithium wire was added to a solution of 16 grams of bromobenzene in 150 ml. of anhydrous ether. The solution was heated at reflux and after 2½ hours the lithium had reacted to form phenyllithium, which was reacted with 12.7 grams of p-diethynylbenzene. An immediate reaction occurred with deposition of a colorless solid which was the dilithium derivative of p-diethynyl benzene, 1,4-phenylenediethynylenedilithium. After one hour of reflux to insure completeness of the reaction, 13.7 grams of mercuric chloride were added and reaction continued for an additional one hour at reflux, by which time the product had precipitated and was removed by filtration. In order to remove the lithium chloride also present, the precipitate was heated with ethanol and filtered hot, leaving behind 15.2 grams of a colorless solid which was insoluble in hot tetrahydrofuran, pyridine, ortho-dichlorobenzene, nitrobenzene, N,N-dimethyl formamide, N,N-diethylacetamide, and dioxane. This product was analyzed and found to correspond to the formula

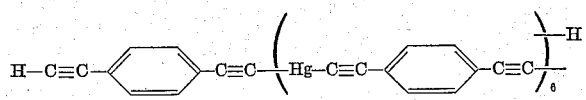

The polymer begins to decompose at 200° C. and forms a carbonaceous material that conducts electricity.

Example 2

Using the same general procedure as Example 1, 1.5 grams of lithium wire was reacted with 17 grams of bromobenzene to produce phenyllithium which was reacted with 9.9 grams of 1,6-heptadiyne to produce the dilithio derivative which was reacted with 14.5 grams of mercuric chloride. The product was 19.1 grams of an insoluble colorless solid which softens at 190° C. and then on further heating resolidifies and gradually darkens as it is heated up to 300° C. Analysis showed that the compound corresponds to the formula:

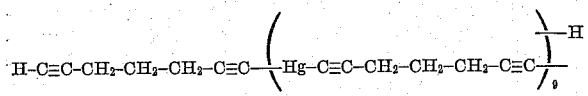

Example 3

This example illustrates the direct reaction of mercuric chloride with a diethynyl hydrocarbon without the necessity of forming the bis(metallo)acetylide. Such a preparation is limited to mercuric halides. A solution of 10.7 grams 1,7,13,19-eicosatetrayne in 100 ml. of ethanol was added to a solution of 11 grams of mercuric chloride, 27 grams of potassium iodide, 27 ml. of water and 21 ml. of 10% aqueous sodium hydroxide solution, cooled in an ice bath. After stirring 10 minutes, 18.5 grams of a product precipitated as a colorless powder which was removed by filtration and washed with cold ethanol. The product begins to soften at 65° C. and is completely melted at 100° C. This product corresponds to the formula:

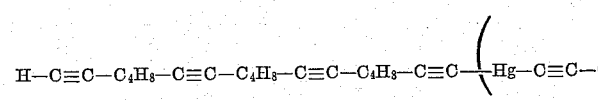

where $n$ is a positive integer greater than 10. Because the theoretical analysis of products where $n$ is 10 or greater is essentially identical, it is not possible to determine the numerical value of $n$ when it is greater than 10.

The above polymer was oxidatively coupled to produce a higher molecular weight polymer by dissolving 5 grams of the product in 135 ml. of pyridine also containing dissolved the pyridine complex of cuprous chloride obtained by dissolving 1 gram of cuprous chloride in the pyridine. Oxygen was passed through the vigorously stirred solution for 70 minutes at ambient temperatures and the product precipitated by addition of methanol. After filtration, there was obtained 3 grams of product as a colorless solid having a melting point of 105–115° C. The polymer was soluble in s-tetrachloroethane. When a solution of the polymer was poured onto a glass plate and the solvent evaporated at 140° C., there was obtained a tough, flexible film.

This polymer corresponds to the formula

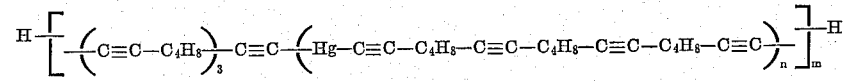

where $n$ is an integer greater than 10 and $m$ is an integer representing the number of repeating units in the polymer molecule.

Example 4

Using the same general procedure as Example 1, the bis(lithio acetylide) from p-diethynylbenzene was prepared from 0.64 gram of lithium, 7.3 grams of bromobenzene, and 5.8 grams of p-diethynylbenzene. This lithium compound was reacted with 5.9 grams of dichlorodiphenylsilane in 250 ml. of ether, by refluxing for 2 hours. The ether solution was washed with water to destroy any lithium end groups and replace them with hydrogen. There were obtained two polymeric fractions, one soluble and one insoluble in ether. These two products both correspond to the formula:

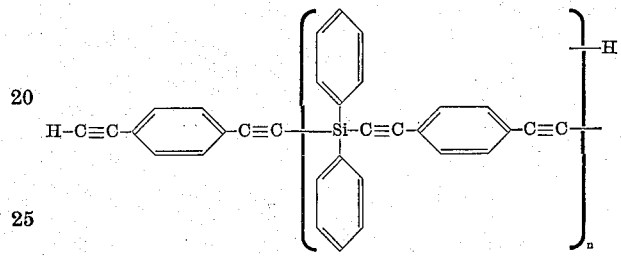

where $n$ represents the number of repeating units in the polymer molecule.

The ether-soluble product was oxidatively coupled by evaporating the ether solution and dissolving the solid obtained in a solution of cuprous chloride-pyridine complex obtained by dissolving 1 gram of cuprous chloride in 135 ml. of pyridine. Oxygen was bubbled through a vigorously stirred solution for 5 minutes by which time the polymeric product had separated as a golden-yellow polymer which was removed by filtration and washed with methanol containing a small amount of hydrochloric acid.

Example 5

Example 4 was repeated except substituting m-diethynylbenzene for the p-diethynylbenzene. In this case the entire product was soluble in diethyl ether and recovered by evaporation of the ether layer and washing thoroughly with alcohol. The product was dissolved in 250 ml. of pyridine containing 2 grams of cuprous chloride which had been complexed with the pyridine. Oxygen was bubbled through a vigorously stirred solution for 15 minutes and the polymeric product precipitated by pouring the reaction mixture into methanol and filtering. There was obtained 3.9 grams of a pale yellow polymeric solid.

When 3.4 grams of cupric chloride dihydrate is substituted for the cuprous chloride, no reaction occurs when oxygen is passed through the solution. However, after the addition of 1.12 grams of potassium hydroxide to convert the cupric chloride complex to the basic cupric chloride complex with pyridine, the reaction proceeds as readily and produces the same product as when cuprous chloride is used as the complex with pyridine.

Likewise, when the oxidative coupling reaction is carried out using N,N-dimethylacetamide as the solvent and the complex of cuprous chloride and N,N-dimethylamine in one case and the complex of cuprous chloride and methylamine in the other case, the reaction proceeds as readily and produces the same product as when the cuprous chloride-pyridine complex is used.

*Example 6*

Phenyllithium was prepared using the general procedure of Example 1, from 1.0 gram of lithium and 11.3 grams of bromobenzene. This was reacted with 4.55 grams of p-diethynylbenzene to produce the bis(lithio acetylide) from diethynylbenzene which was reacted with 4.5 grams of dichlorodiethylsilane in 250 ml. of ether. The product which was isolated was added to 135 ml. of pyridine containing 1 gram of cuprous chloride complexed with the pyridine. Oxygen was bubbled through a vigorously stirred solution at ambient temperatures for 5 minutes during which time the temperature of the reaction rose to 46° C. and the reaction mixture became viscous. The reaction mixture was poured into methanol to isolate 2.3 grams of a bright yellow solid product which was soluble in hot s-tetrachloroethane and could be cast into transparent flexible films by evaporation of the solvent at 120° C.

The above reaction was repeated in which a dichlorodimethylsilane was substituted for the dichlorodiethylsilane.

*Example 7*

In the same general procedure used in Example 1, 1,3-phenylenediethynylenedilithium was prepared from 1.4 grams of lithium wire, 15.8 grams of bromobenzene and 6.3 grams of m-diethynylbenzene in diethyl ether and reacted with 4.9 ml. of dichlorodimethylsilane. The ether solution was washed with water and evaporated and the product precipitated with ethanol. The residue was redissolved in ether and reprecipitated to give 5.6 grams of an almost colorless solid having a melting point of 105–110° C.

This product was oxidatively coupled to a higher molecular weight polymer by dissolving 3 grams of the above prepared product in pyridine also containing dissolved 1 gram of cuprous chloride as a complex with the pyridine. Oxygen was bubbled through the vigorously stirred solution for 0.5 hour, at which time the product was precipitated by addition of methanol and filtered. The product was soluble in hot s-tetrachloroethane and was purified by filtering the solution and reprecipitating with methanol. There was obtained 2.7 grams of a polymeric product which although soluble in tetrachloroethane was not capable of being melted at relatively high temperatures without decomposition.

*Example 8*

Using the procedure outlined in Example 1, 1,4-phenylenediethynylenedilithium was prepared as a suspension in 500 ml. of ether from 1.8 grams of lithium wire, 20.3 grams of bromobenzene and 8.1 grams of p-diethynylbenzene. To this suspension was added 21 grams of diiodophenylarsine. The reaction mixture was heated at reflux for 2 hours, water was added and a solid product was removed by filtration. On evaporation of the ether layer which was washed with ethanol, there was obtained an additional product which was dissolved in chloroform and reprecipitated in methanol. The product which was precipitated from the reaction mixture was also purified by dissolving in pyridine, filtering and reprecipitated by addition to methanol to give 7.5 grams of a bulky, colorless solid which had a melting point at 160° C. with decomposition. Both of these products were oxidatively coupled to form higher molecular weight polymers by dissolving 2 grams of each in separate portions of 135 ml. of pyridine also containing a copper complex made by dissolving 2 grams of copper chloride in the pyridine. Both of the products were soluble in various solvents such as tetrachloroethane, nitrobenzene, chlorobenzene, from which the polymer could be cast into films.

When the reaction was repeated using 2.05 grams of lithium wire, 23.4 grams of bromobenzene and 9.3 grams of p-diethynylbenzene and 25 grams of diiodophenylarsine, there was obtained 10.2 grams of almost colorless solid which could be cast into a somewhat brittle film. When this product was oxidatively coupled to a higher molecular weight polymer, a product was obtained having an intrinsic viscosity of 0.175 when measured in chloroform at 25° C. and could be cast from s-tetrachloroethane to give a flexible film.

Because of the reactivity of the acetylenic group which still remains in the products of this invention, they may be used for example as chemical intermediates for the preparation of other interesting and valuable organic compounds. For example, they may be hydrogenated or halogenated to produce fully saturated organic compounds having many and varied uses in the chemical field. The insoluble polymers may be compacted and formed into solid fuels or used as fillers and the soluble polymers used to produce films. Many other wide and useful applications in addition to those already disclosed may be made of the soluble polymers when used as coating materials or impregnants of porous materials and later thermally decomposed if desired. They may be used as binders for any solid fuel or for insoluble polymers of the present invention. The products may also be converted into carbonaceous materials still having heteroatom in the carbonaceous residue to produce products having many interesting and valuable properties especially electrical properties, which have application in making semiconductors, resistors, etc. They may be used in either the polymeric or carbonaceous form as fillers for natural and synthetic rubbers and other polymeric and resinous compositions.

Obviously, other modifications and variations of the present invention are possible in the light of the above teachings. It is, therefore, to be understood that changes may be made in the particular embodiments of the invention described which are within the full intended scope of the invention as defined by the appended claims.

What I claim as new and desire to secure by Letters Patent of the United States is:

1. A composition comprising a heteroacetylenic compound containing both (a) divalent M units selected from the group consisting of

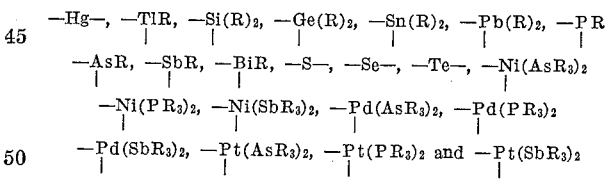

where R is a monovalent hydrocarbon radical, and (b) —C≡C—R'—C≡C— units, where R' is a divalent hydrocarbon radical, the two valences of the M units being connected directly to separate said —C≡C—R'—C≡C— units, the remaining valence of each of the

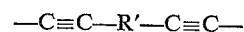

units being satisfied by a member selected from the group consisting of hydrogen, previously defined M units and previously defined —C≡C—R'—C≡C— units.

2. A composition corresponding to the formula

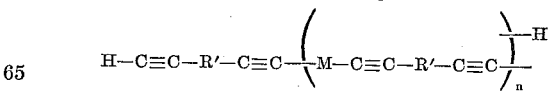

where $n$ is a positive integer and is at least one, M is a divalent radical selected from the group consisting of

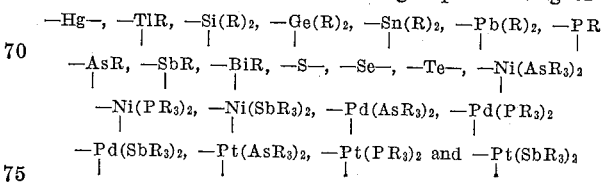

where R is a monovalent hydrocarbon and R' is a divalent hydrocarbon radical.

3. A composition of claim 2 where M is —Hg—.

4. A composition of claim 2 where M is —Hg— and R' is phenylene.

5. A composition of claim 2 where M is —Hg— and R' is ethylene.

6. A composition of claim 2 where M is —Hg— and R' is —$C_4H_8$—.

7. A composition of claim 2 where M is dihydrocarbon-substituted silylene.

8. A composition of claim 2 where M is a diphenyl silylene and R' is phenylene.

9. A composition of claim 2 where M is diethylsilylene and R' is phenylene.

10. A composition of claim 2 where M is dimethylsilylene and R' is phenylene.

11. A composition of claim 2 where M is phenyl arsylene.

12. A composition of claim 2 where M is phenyl arsylene and R' is phenylene.

13. A composition comprising the polymer corresponding to the formula

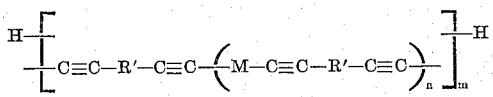

where M is a polyvalent radical selected from the group consisting of

—Hg—, —TlR—, —Si(R)$_2$, —Ge(R)$_2$, —Sn(R)$_2$, —Pb(R)$_2$, —PR

—AsR, —SbR, —BiR, —S—, —Se—, —Te—, —Ni(AsR$_3$)$_2$

—Ni(PR$_3$)$_2$, Ni(SbR$_3$)$_2$, —Pd(AsR$_3$)$_2$, —Pd(PR$_3$)$_2$, —Pd(SbR$_3$)$_2$

—Pt(AsR$_3$)$_2$, —Pt(PR$_3$)$_2$ and —Pt(SbR$_3$)$_2$ where R is a monovalent hydrocarbon radical, R' is a divalent hydrocarbon radical, and $n$ is a positive integer and is at least one and $m$ is a positive integer and is at least two.

14. A composition of claim 13 where M is —Hg—.

15. A composition of claim 13 where M is —Hg— and R' is —$C_4H_8$—.

16. A composition of claim 13 where M is dihydrocarbon-substituted silylene.

17. A composition of claim 13 where M is diphenylsilylene and R' is phenylene.

18. A composition of claim 13 where M is diethylsilylene and R' is phenylene.

19. A composition of claim 13 where M is dimethylsilylene and R' is phenylene.

20. A composition of claim 13 where M is hydrocarbon-substituted arsylene.

21. A composition of claim 13 where M is phenylarsylene and R' is phenylene.

22. The process of preparing heteroacetylenic compounds which comprises reacting a metallo derivative of a diethynyl hydrocarbon with a dihalocompound selected from the group consisting of HgX$_2$, RTlX$_2$, R$_2$SiX$_2$, R$_2$GeX$_2$, R$_2$SnX$_2$, R$_2$PbX$_2$, RPX$_2$, RAsX$_2$, RSbX$_2$, RBiX$_2$, SX$_2$, SeX$_2$, TeX$_2$, (R$_3$As)$_2$NiX$_2$, (R$_3$P)$_2$NiX$_2$, (R$_3$Sb)$_2$NiX$_2$ (R$_3$As)$_2$PdX$_2$, (R$_3$P)$_2$PdX$_2$, (R$_3$Sb)$_2$PdX$_2$, (R$_3$As)$_2$PtX$_2$, (R$_3$P)$_2$PtX$_2$, and (R$_3$Sb)$_2$PtX$_2$, where X is halogen and R is a monovalent hydrocarbon.

23. The process of forming self-condensation products of a heteroacetylenic compound which comprises reacting oxygen with a compound corresponding to the formula

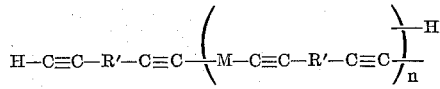

where $n$ is a positive integer and is at least one, R' is a divalent hydrocarbon radical and M is a polyvalent radical selected from the group consisting of —Hg—, —TlR, —Si(R)$_2$, —Ge(R)$_2$ —Sn(R)$_2$, —Pb(R)$_2$, —PR, —AsR, —SbR, —BiR, —S—, —Se—

—Te—, —Ni(AsR$_3$)$_2$, —Ni(PR$_3$)$_2$, —Ni(SbR$_3$)$_2$, Pd(AsR$_3$)$_2$

—Pd(PR$_3$)$_2$, —Pd(SbR$_3$)$_2$, —Pt(AsR$_3$)$_2$, —Pt(PR$_3$)$_2$ and

—Pt(SbR$_3$)$_2$ where R is a monovalent hydrocarbon radical, in a solution also containing dissolved therein, as the oxygen-carrying intermediate, an amine-basic cupric salt complex.

References Cited

UNITED STATES PATENTS

| | | | |
|---|---|---|---|
| 1,963,935 | 6/1934 | Carothers et al. | 260—80 |
| 2,848,520 | 8/1958 | Rutledge | 260—665 |

JOSEPH L. SCHOFER, *Primary Examiner.*

H. WONG, *Assistant Examiner.*